United States Patent [19]

Aggarwal et al.

[11] 4,276,009
[45] Jun. 30, 1981

[54] APPARATUS FOR MAKING CAST ANNULAR LAMINATES

[75] Inventors: Sundar L. Aggarwal, Akron; Leon F. Marker, Cuyahoga Falls; Thomas J. Dudek, Tallmadge; Robert J. Herold, Akron, all of Ohio

[73] Assignee: The General Tire & Rubber Company, Akron, Ohio

[21] Appl. No.: 48,943

[22] Filed: Jun. 15, 1979

Related U.S. Application Data

[60] Continuation of Ser. No. 884,778, Mar. 8, 1978, abandoned, which is a division of Ser. No. 777,200, Mar. 14, 1977, Pat. No. 4,102,971.

[51] Int. Cl.³ .............................................. B29H 5/00
[52] U.S. Cl. ......................................................... 425/130
[58] Field of Search ............... 425/129, 38, 35, 28 R, 425/52, 589, 439, 429, 130; 264/328

[56] References Cited

U.S. PATENT DOCUMENTS

| | | | |
|---|---|---|---|
| 2,476,884 | 7/1949 | Maynard | 425/52 X |
| 2,897,540 | 8/1959 | Rhodes | 425/129 X |
| 3,457,594 | 7/1969 | Baudou | 425/35 |

FOREIGN PATENT DOCUMENTS 1034336  6/1966  United Kingdom ...................... 425/38

Primary Examiner—J. Howard Flint, Jr.

[57] ABSTRACT

A laminated product such as a tire is cast from chemically extending liquids which form a laminated solid in a mold. The mold cavity is closed in preparation for use except for casting fluid inlet ports and exhaust vents. The mold cavity defines the shape of the product to be cast. Two or more chemically extendable liquids are injected into the mold without mixing through the inlet ports. Each liquid is injected through a different port. After injection, the liquids are arranged in alternate circumferential segments within the annular space. At least one of the inner and outer surfaces which define the mold cavity is then rotated about the common axis to impart a spiral configuration to each of the injected liquids. The liqiuds are then allowed to chemically extend to solids and form a laminated product such as a tire. The products, when they comprise alternate layers of high and low elastic modulus materials, have better resistance to flex cracking than non-layered materials of similar composition having similar average stiffness.

1 Claim, 6 Drawing Figures

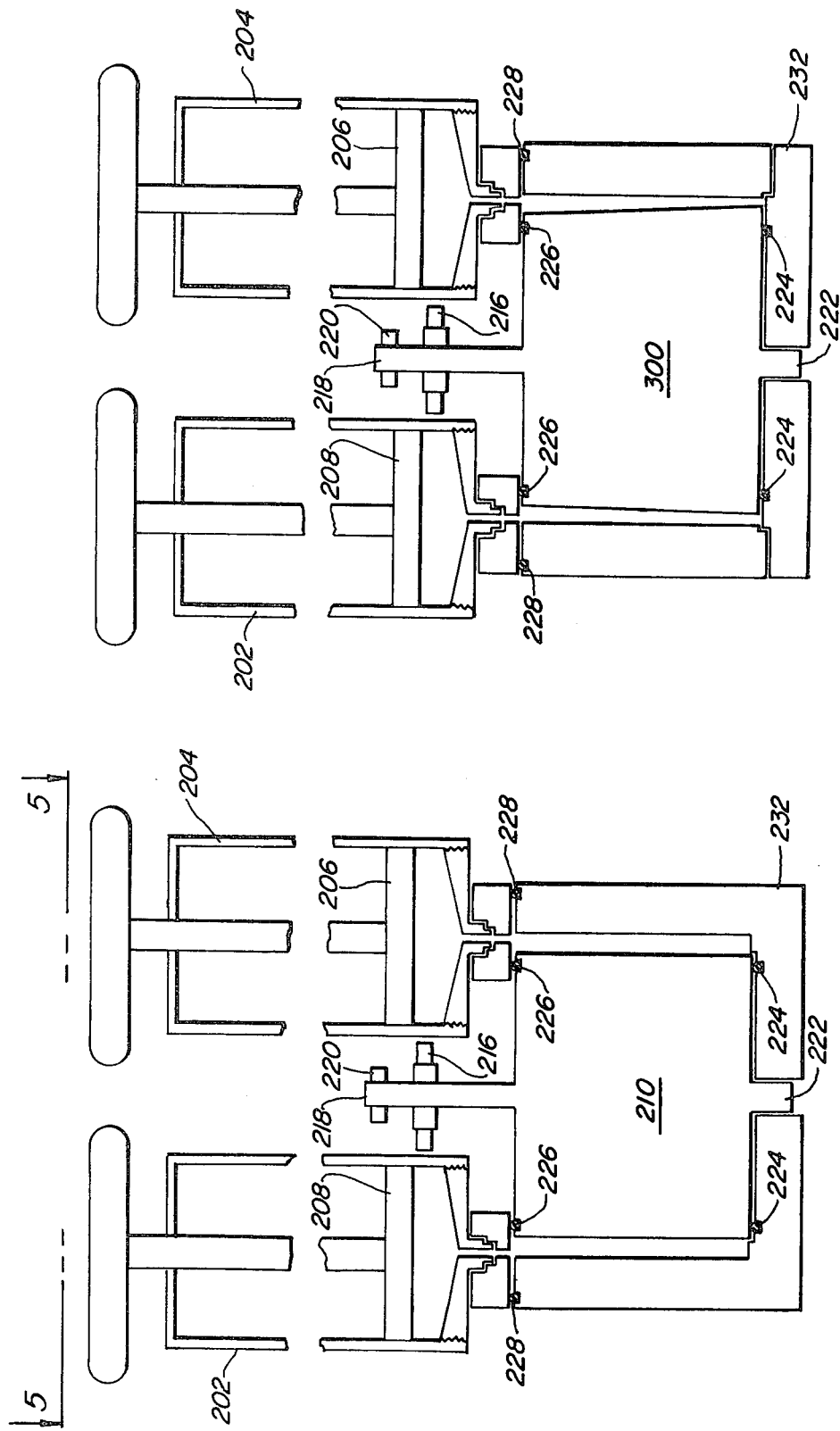

APPARATUS FOR MAKING CAST ANNULAR LAMINATES

This is a continuation of application Ser. No. 884,778 filed Mar. 8, 1978, now abandoned, which in turn is a division of application Ser. No. 777,200 filed Mar. 14, 1977, now U.S. Pat. No. 4,102,971.

BACKGROUND OF THE INVENTION

1. Field of the Invention

The present invention relates to a method for making laminated products from chemically extending liquids and laminated articles of complex geometry made thereby. The products are made by injecting a plurality of chemically extending liquids without mixing in circumferential arrangement about the axis of a mold cavity. One surface of the mold rotates with respect to the other about a common axis causing the plurality of liquids to form a layered structure which chemically extends to a solid laminate. Preferably, the layers of the laminate are formed from two liquids, the layers formed from one liquid having a different modulus of elasticity than the layers formed from the second liquid. Laminated materials made by this process have superior flex resistance after suffering a surface cut compared to corresponding homogeneous materials.

1. Description of the Prior Art

Rubber articles which are subject to stress and flexing have historically been made in a mold. Such articles include vehicle tires and rubber bushings such as spring shackle bushings. Many of these rubber articles such as tires are laminates in which the lamina consists of multiple plies of rubber and multiple plies of rubberized fabric. A laminate made according to the prior art process is first formed then the laminated product is placed in a mold and cured.

Fairly recently techniques for casting nonconventional tires from chemically extending liquids have been developed. For example of techniques and materials used in making cast tires see U.S. Pat. Nos. 3,537,500 Beneze (1970), 3,555,141 Beneze (1971), 3,701,374 McGillvary (1972), 3,755,528 Beneze (1973), 3,860,052 Schroeder (1975), 3,879,161 McGillvary (1975), 3,902,836 McIntosh (1975), 3,932,088 Harada (1976), 3,980,606 Werner (1976) and Defensive Publication No. T-952006. While the methods of the prior art are useful in making cast tires, tires so made have a serious deficiency. That deficiency is the lack of resistance to crack propagation on repeated flexing. When a crack starts in the outer surface of a homogeneous cast tire, the crack will propagate through the tire uninterruptedly.

The concept of forming laminates by rotating the surfaces through which different thermoplastic materials simultaneously flow is known, see U.S. Pat. No. 3,737,263 Schrenk, et al (1973). An explanation of what happens when the die of an extruder rotates while extruding different thermoplastic materials (from the die) is found in an article by Schrenk, et al in the SPE Journal of June 1973, Volume 29, page 38. Schrenk, et al formed films of plastic layers. When individual layers consisted of high modulus low elongation material sandwiched between softer polymers the alternate layers exhibited mutual reinforcement; see applied Science Symposium No. 24, 9-12 (1974) authored by O. W. J. Schrenk and Polymers Engineering and Science November 1969, Volume 9, No. 6, pages 393-400 Schrenk, et al.

SUMMARY OF THE INVENTION

According to the present invention a laminated annular article such as a tire is formed inside of the mold of the present invention. The mold cavity as in conventional tire fabrication, defines the shape of the article to be cast. However, in the mold of the present invention the inner and outer surface of the mold cavity are rotatable with respect to each other. Chemically extending liquids are arranged as alternate circumferential segments in the mold cavity and then one surface of the mold cavity is rotated with respect to the second surface of the mold cavity. This causes each segment of chemically extending liquid to form a spiral of layers within the mold.

The present invention overcomes the prior art problem encountered in forming a laminated article such as a tire by tediously laying up one layer at a time. It also solves a problem inherent in prior art homogeneous one-piece cast articles, that problem being uninterrupted crack propagation due to repeated flexing.

BRIEF DESCRIPTION OF THE DRAWINGS

FIG. 4 is a cross-sectional view of a cylinder mold;

FIG. 6 is a cross-sectional view of a mold for forming an article having a cylindrical outer surface and a wedge shaped wall cross-section.

DESCRIPTION OF THE PREFERRED EMBODIMENTS

Figure 1:
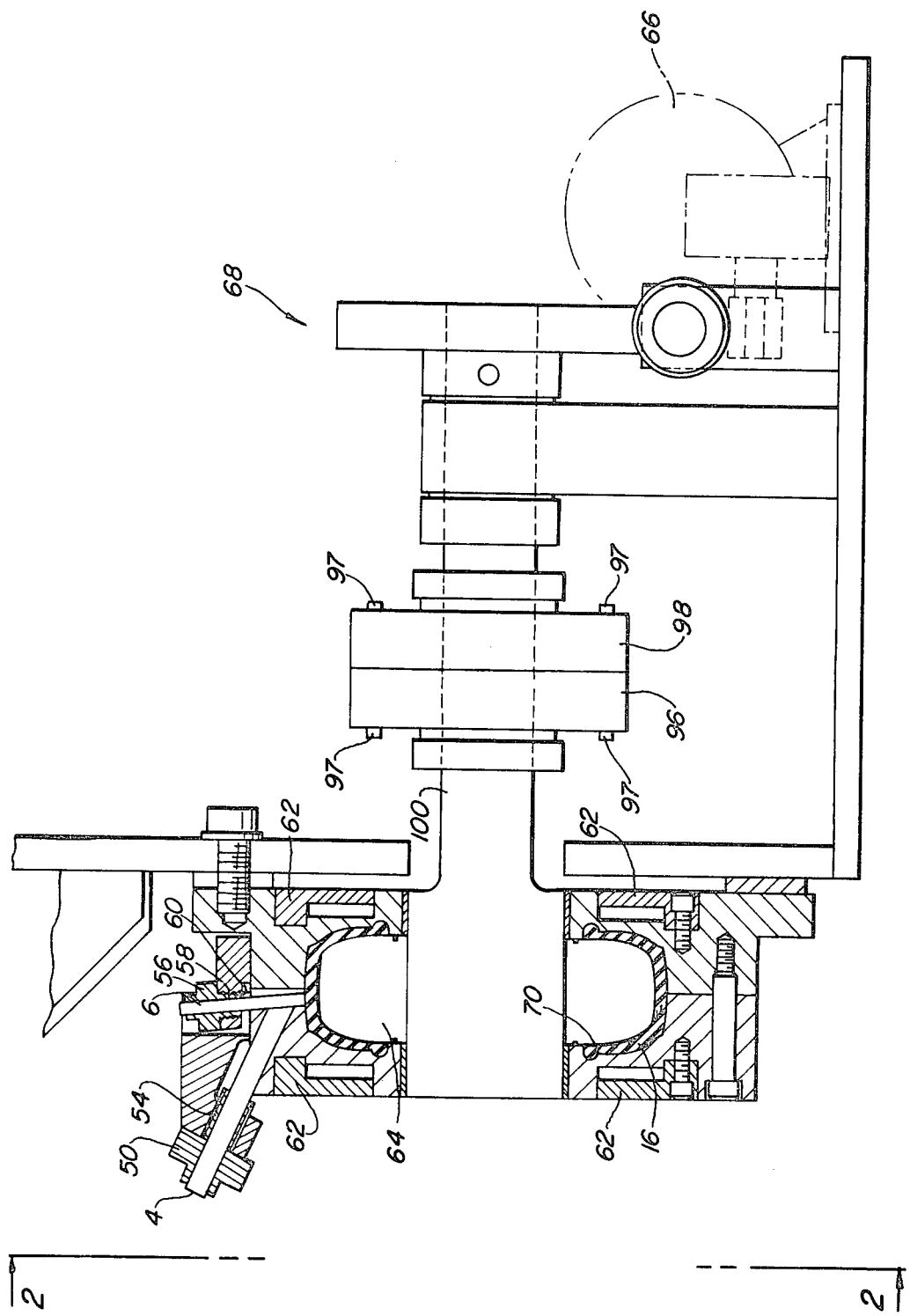
FIG. 1 is a cross-sectional view taken through the axis of rotation of the inner surface of a tire mold of the present invention.
Figure 2:
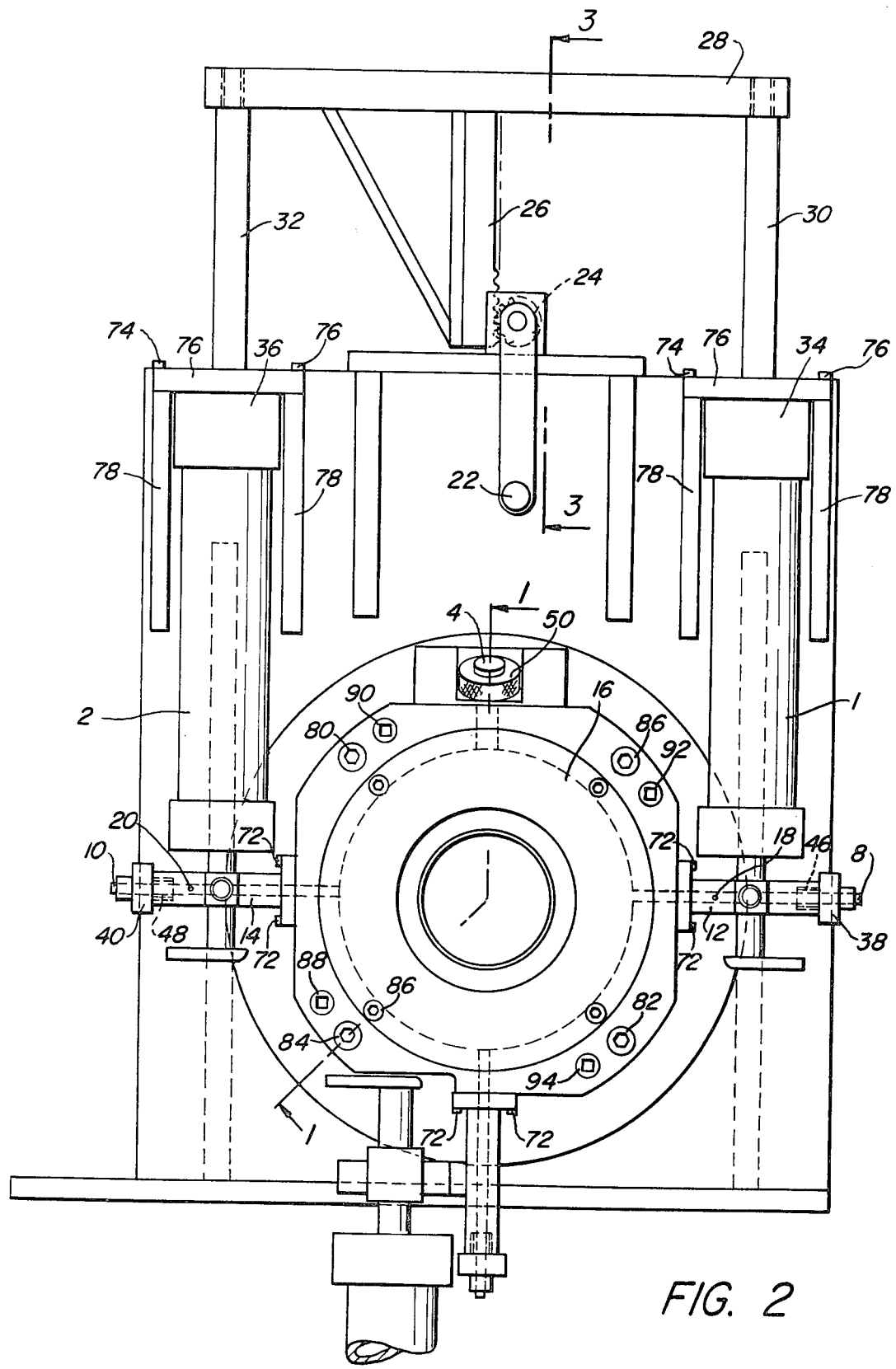
FIG. 2 is a front view of the tire mold.
Figure 3:
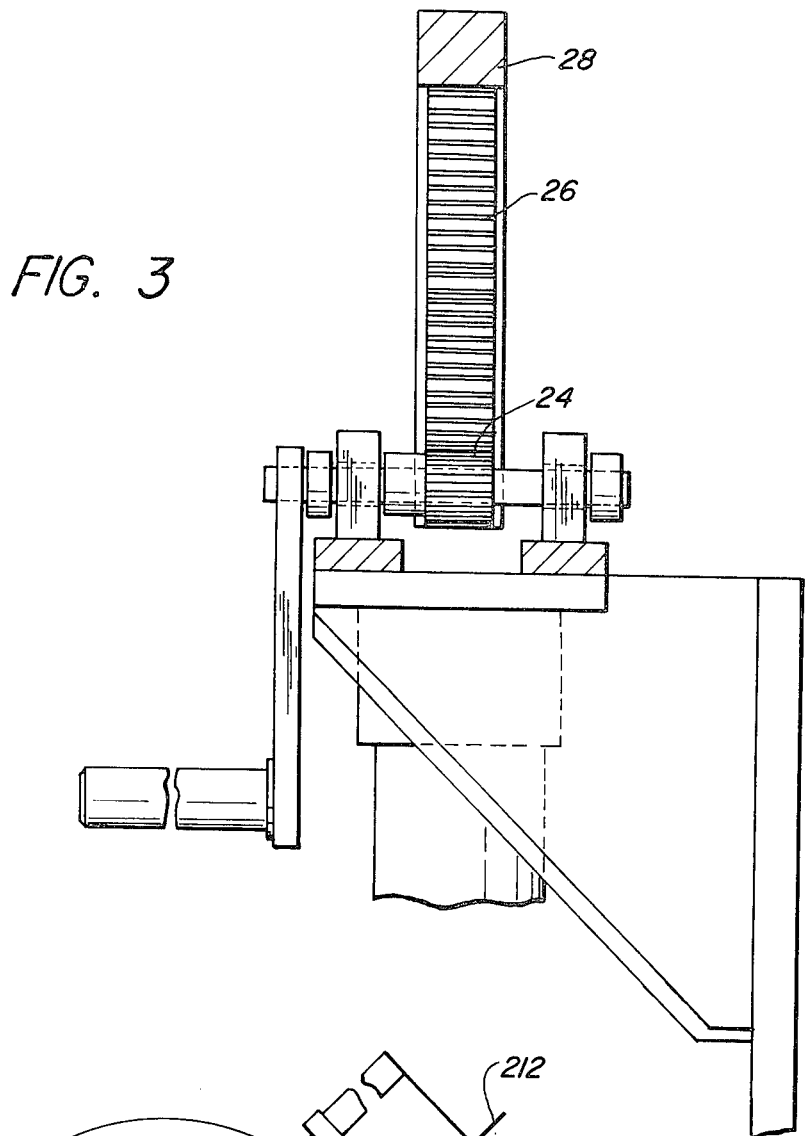
FIG. 3 is a side view of the syringe drive mechanism.

The present invention is directed to a method and an apparatus for molding and chemically extending a plurality of liquids into a solid annular laminated article. The apparatus comprises an annular closed chamber, the chamber having an annular inner surface and an annular outer surface. The surfaces define the shape of the article to be molded, which shape is symmetrical about an axis of rotation. The liquids are introduced into the chamber through a plurality of feedports. In normal operation, only one liquid is introduced through each feedport. The feedports are arranged so that when the liquids enter, each liquid will form a circumferential segment within the chamber. The annular inner surface has a common axis with the annular outer surface and is rotatable with respect to the outer surface.

Annular, is defined as a space defined by the inner surface of a mold, which space is symmetrical about an axis of rotation of at least part of the inner surface of the mold.

An extendable liquid is defined as a liquid which cures by a chain coupling or cross-linking reaction to a cross-linked solid or a thermoplastic solid.

One preferred configuration of the closed chamber is that of a tire. The apparatus, however, may also be used to manufacture rubber bushings in which case the closed chamber would have the configuration of a bushing. Normally, to expedite the curing of the chemically extending liquids, heating elements are incorporated into the mold.

The viscosities of the liquids injected into the rotational chamber can range from 2.5 to 1000 poises and preferably from 10 to 400 poises at the rotation temperature.

The velocity of one mold surface with respect to a second mold surface can range from 0.02 meters per minute to 30 meters per minute and preferably from 0.1 meters per minute to 6 meters per minute.

The thickness of each layer of the laminate can range from less than 0.1 mm to greater than 2.0 mm depending upon the total thickness of the laminate. Each layer is preferably 0.1 mm to 1.0 mm thick.

The present invention is applicable to chemically extending liquid systems in general, such as: polypropylene ether diols and/or triols extended with diisocyanates and/or polyisocyanates; polypropylene ether diols and/or triols extended with diisocyanates and/or polyisocyanates together with low molecular weight diol or triol extending agents and utilizing ether "one shot" or prepolymer technique; and polypropylene ether diols and/or triol isocyanate prepolymers extended with diamines.

The above systems can also be applied to all other hydroxyl terminated polymers, for example, polytetramethylene ether diols, polyester diols and hydroxyl terminated polybutadiene, in place of polypropylene ether diols and/or triols. Examples of other useful systems are: amine terminated polymers (i.e., polybutadiene, polypropylene ether) extended with diepoxides and also with diisocyanates and/or polyisocyanates; carboxy terminated polymers (i.e., polybutadiene polyester, polypropylene ether) extended with diaziridinyl and/or polyaziridinyl compounds; mercaptan terminated polybutadiene extended with diisocyanates and/or polyisocyanates and also with peroxide compounds; bromine terminated polymers (i.e., polybutadiene, polyisobutylene) extended with diamines and/or quaternized diamine salts; vinyl terminated polybutadiene extended with diamines and/or polyamines and also with dimercaptans and/or polymercaptans.

The preferred chemically extending liquids of the present invention are those forming the polyurethanes and polyureas. These are produced by the reaction of isocyanates and isocyanate prepolymers with hydroxyl or amine terminated polymers and extending agents. The polymers are of the polyether, polyester or polydiene type. The molecular weights of the polypropylene ether polyols range from 700 to 15,000 and preferably from 1,000 to 10,000. The preferred molecular weights of the polydienes and particularly the polyesters preferably range from 1,000 to 8,000. In the practice of the present invention the viscosities and therefore, the molecular weights of the liquids used are important to the process in that at too high viscosities and molecular weights, layers will not form. However, the properties of the final castings are affected by the molecular weight of the polymers used.

Extending agents include difunctional materials and mixtures of difunctional and trifunctional material. Specific material which can be employed in the practice of the present invention include: ethylene glycol, butanediol, trimethyolpropane, 1,2-propane diol, 1,3-propane diol, 2,3-butanediol, 1,3-butanediol, 1,5-pentane diol, hexanetriol, tri(hydroxypropoxypropane) and methylene-bis-4-(3-chloroanaline) and methylene dianiline. The trifunctional materials, in addition to being extending agents, are also cross-linking agents.

Materials containing isocyanate functional groups reactive with the above extending agents and with hydroxyl and amine terminated polymers in general include:

(1) Diisocyanates a. toluene-2,4-diisocyanate
b. tuluene-2,6-diisocyanate
c. mixtures of the above, e.g. 80/20 and 65/35 2,4/2,6 being available commercially
d. methylene-bis-(4-phenylene isocyanate)
e. methylene-bis-(4-cyclohexylene isocyanate)
f. hexamethylene diisocyanate
g. naphthylene-1,5-diisocyanate (2) Polyisocyanates (average functionality higher than 2.

a. mixtures of methylene-bis-(4-phenylene isocyanate) and higher homologs, e.g., 3-(4-isocyanatobenzyl)-methylene-bis-(4-phenylene ioscyanate)

(3) Prepolymers

These comprise the reaction products of polymer diols and/or polymer triols with diisocyanates such that the resulting product is a liquid and has isocyanate terminal groups. (Some such prepolymers are made with exactly sufficient diisocyanate (one mole per hydroxyl) to cap the ends. In the case of diisocyanates such as toluene-2,4-diisocyanates which have unequally reactive isocyanate groups, all of the more reactive groups react preferentially and there is minimal coupling. In other cases such as with methylene-bis-(4-phenylene isocyanate) which has equally reactive isocyanate groups more than one mole of diisocyanate per hydroxyl group is necessary to reduce coupling.

The ratio of difunctional to trifunctional polymers, extending agents or isocyanate materials is selected according to the properties desired in the intended use. Generally, for good rubbery properties, the ratio is chosen so that the cross-link density does not exceed one cross-link per 5,000 molecular weight units and preferably should not exceed one cross-link per 10,000 molecular weight units. It will, thus be obvious that the proportion of difunctional to trifunctional material will depend on the molecular weight of the original polymer and in some cases such as with a 15,000 molecular weight polyether triol, it would be suitable to have all trifunctional material.

The catalysts which can be employed in the practice of the present invention including the metal salts disclosed by Sanders and Frisch in Polyurethane Volume XVI Part I of High Polymers Interscience 1962. The preferred catalysts are those which, on mixing with the reactive ingredients, allow an extended period of constant or slowly rising viscosity at the temperature used to charge the mold and develop the layers, and which give rapid curing at elevated temperatures. Some catalysts such as zinc napthenate appear to have such properties naturally. With certain other catalysts this can be accomplished by chemically or physically complexing the catalyst. Thus, amine catalysts have been physically complexed with synthetic zeolites and stannous octoate has been chemically complexed with pyrogallol to accomplish such a purpose.

Another way of obtaining long pot life and thereafter, a rapid cure is to complex one of the ingredients. Thus, a diamine extruding agent has been so complexed with sodium chloride that it is essentially unreactive with isocyanate prepolymers below 60° C. but which reacts rapidly with these materials above 80° C. Too rapid a viscosity increase interfers with the lamination process.

In a pneumatic tire, it is usually necessary to include a high strength, high stiffness bead. Conventional practice calls for the use of metal beads. For the purpose of the present invention the bead could be replaced by hard plastic for tires with low speed requirements. The bead may be supported in the mold during the casting operation by small blocks of precured or partially cured elastomer or by pins. As an alternative the bead region of the tire mold may be filled with a preformed partially cured rubber section occurable with the laminate formulation and which contains the bead. This bead may be wrapped with fabric so as to further reinforce this section of the tire.

In order to enable one of ordinary skill in the art to practice the present invention, examples of the practice contemplated by the invention are set forth below.

In the examples as elsewhere in the specification and claims, all parts and percentages are by weight unless otherwise specified. Molecular weights are number average molecular weights.

EXAMPLE I

The following examples set forth the compositions and procedures used in casting a laminate using two liquids identified as 'A' and 'B'. The following composition and procedures are used in the preparation of 'A' and 'B'. Liquid 'A' is colored with carbon black.

|  | A | B |
|---|---|---|
| Adiprene[1] L-42 | 200 |  |
| Adiprene[1] L-167 |  | 90 |
| Adiprene[1] L-315 |  | 60 |
| 20% carbon black is dioctyl phthalate |  |  |
| Dioctyl Phthalate | 0.40 |  |
| 10% Niax[3] -L-75 in DOP | .133 | .10 |
| 10% Niax[3] -L-77 in DOP | .133 | .10 |

[1]Adiprenes (E.I. duPont tradename); Toluene diisocyanate prepolymers of polytetramethylene ether glycols. The equivalent weight per isocyanate function of L-42 is 1550; of L-167 is 665; and of L-315 is 495.
[3]The surfactant is not critical and surfactants used in making cast polyurethane parts can be used. Niax-L-75 and Niax L-77 surfactants are conventional polyether silicone copolymers. Niax is a tradename of Union Carbide.

The above were mixed into the solutions and the resultant solutions were degassed at 95° C. for 10 minutes.

| Caytur[2]-21 | 30.6 | 63.0 |
|---|---|---|
| Dioctyl Phthalate | 16.8 |  |

[2]Caytur 21 (E.I. duPont tradename): 50% dioctylphthalate; 50% of sodium chloride complex of 4,4-methylene dianiline. Equivalent weight per amine function: 219

The above materials were then mixed into the initial mixtures and degassed in an oil bath at 60° C. for 20 minutes.

Pressure piston 4 and shut-off rod 6 are removed from the top of the mold shell. Shut-off rods 8 and 10 are pulled from the channels 12 and 14 leading from the cylinder 1 and 2 to the mold cavity 16 and are locked in place in intake ports 12 and 14 by pins 18 and 20. The pins, thus, secure the rods to prevent the fluid from the cylinders from discharging out of the sides of the mold through the outside openings in the intake ports. The mold is then filled by turning handle 22 which turns gear 24 which, in turn, drives rack 26 in a downward direction. Rack 26 is attached to backing bar 28 which, in turn, is attached to stems 30 and 32. The stems drive plungers 34 and 36 into cylinders 1 and 2, forcing their contents into mold cavity 16.

The contents of cylinders 1 and 2 (liquids 'A' and 'B') flow into the mold cavity until they meet at the bottom. Then each individual liquid fills its respective side of the mold cavity until the two liquids meet and then fill to the top of the mold cavity. The filling of the mold cavity can be visually determined through the opening left by the removal of pressure piston 4. After the mold has been filled, pins 18 and 20 are removed from the inlet ports, and shut-off rods 8 and 10 are inserted until they completely fill the inlet ports. Shut-off rods 8 and 10 each have external knobs 38 and 40 which have threaded shanks which screw into mating threads 46 and 48 in inlet ports 12 and 14. Pressure piston 4 is then screwed back into place by turning knob 50 which screws threaded shank 52 into threaded recess 54 of the mold.

In order to prevent temperature fluctuation and heat loss from the mold, it is preferred to cover the mold with removable rigid foam insulation, not shown. This is usually a single piece which fits the contour of the mold and is easily slipped on and off.

Shut-off rod 6 is inserted and locked into place by turning knob 56 which turns threaded shank 58 into threaded recess 60. The mold temperature has previously been adjusted to 60° C. by applying current to resistance heating element 62. Mold core 64 is then rotated at 1 rpm by means of drive motor 66 and drive train 68. The mold core 64 is rotated four revolutions to form an eight-layer laminate. Mold core 64 is 139 millimeters in diameter and 91 millimeters wide.

The tire 70 which forms inside of the mold cavity is allowed to remain in the mold cavity for 180 minutes at 140° C. in order to cure the tire. The sidewall thickness of the tire formed was 3.5 millimeters, the tread thickness was 4.5 millimeters and the bead thickness from the outside of the tire to the inside was 6.5 millimeters.

The apparatus and procedures for removing a cast tire from a mold are well-known and described in the cast tire patents referred to above. The mold used in Example I had a solid core and, thus, the tire could not be removed in one piece. The tire produced had a clearly defined (as determined by cutting cross-section) laminated structure.

In normal operation, the tire mold is disassembled after each tire is cast to remove the tire from the mold and also to clean the mold. In particular, the intake ports need cleaning for the next use. The following procedure is used to clean the mold. The procedure also points out the various parts used in the mold and their functions.

After removal of the insulation, all of the shut-off rods are removed from the mold. Then the six cap screws 72 which hold the intake ports to the mold shell are removed. The bolts 74 which attached the cylinder support plates 76 to the upper support angles 78 are then removed. When a bottom cylinder is also present on the mold, the bottom cylinder is removed in the same manner as the top cylinders. The piston rods 30 and 32 which are screwed into the top rack gear yoke 28 are unscrewed. The same procedure is used for the bottom cylinder and all of the cylinders are removed from the mold.

Diagonally opposed shoulder bolts 80 and 82 are removed from the mold face and replaced with guide rods. Shoulder bolts 84 and 86 are then removed. Jack screws are then inserted in the tapped holes 88, 90, 92 and 94 in the shell face. The four bolts 97 which hold coupling halves 96 and 98 in place are removed.

The jack screws in the face of the mold are then screwed in until the face of the mold core 64 and the front section of drive shaft 100 can be manually removed from the front of the mold. The type of rotor or core which can be employed can be selected from the various types described in U.S. Pat. No. 3,902,836 McIntosh (1975). It is particularly important to clean the intake ports after every use because they usually contain partially cured polyurethane.

EXAMPLE II

This example sets forth the compositions and procedure used to cast elastomeric cylindrical hoops used to determine the flex life of laminated and unlaminated samples. Liquids $A_2$ and $B_2$ used to cast the cylindrical hoop are prepared as follows:

The dimension of the mold are as follows:

| Rotor diameter | 10.1 cm |
|---|---|
| Outer annular diameter | 10.7 cm |
| Height | 7.4 cm |
| Part thickness | 3 mm |

The following materials were mixed and heated under nitrogen for 20 minutes at 100° C.

|  | $A_2$ | $B_2$ |
|---|---|---|
| Niax 11-27[1] | 75 |  |
| Diol[2] |  | 75 |
| Toluene diisocyanate (80/20 2,4/2,6) | 8.0 | 8.0 |
| Dioctyl Phthalate (DOP) | — | 7.5 |

[1]6500 MW polypropylene ether triol - capped with ethylene oxide - commercial.
[2]8200 MW polypropylene ether diol - capped with ethylene oxide - prepared with zinc hexacyanocobaltate.

The following was mixed into the above solutions and heated under nitrogen for 20 minutes at 70° C.

|  | $A_2$ | $B_2$ |
|---|---|---|
| Ethylene glycol | 18.8 | 19.2 |

The following materials were mixed into the above solutions and the mixtures were degassed in an oil bath at 30° C. for 3 minutes.

|  | $A_2$ | $B_2$ |
|---|---|---|
| Toluene diisocyanate (80/20 2,4/2,6) | 48.2 | 47.8 |
| Zinc naphthenate | 0.02 | 0.02 |

Figure 5:
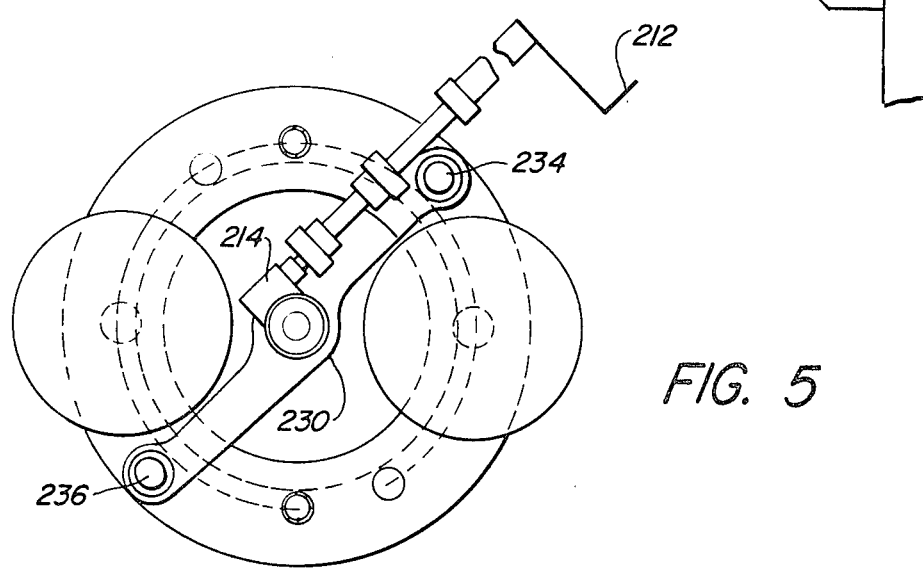
FIG. 5 is a top view of a cylinder mold.

The resulting fluids were charged to the mold of FIGS. 4 and 5a using cylindrical rotor with the mold. The mold temperature was 80° C.

Loading cylinder 202 was filled with liquid '$A_2$' which had a viscosity of 80 poises. Loading cylinder 204 was filled with liquid '$B_2$' which had a viscosity of 90 poises.

Pressure piston 206 and 208 were then moved downward at the same rate of speed to fill one side of the mold with liquid '$A_2$' and the other side with '$B_2$'. As each side of the mold was filled at the same rate, the liquids limited each others flow. Optionally, dikes could be provided and removed after filling.

Rotor 210 was then turned two revolutions slowly by turning crank 212 which turns rotor 210 through rack and pinion gear train 214. Pinion gear 216 is attached to rotor shaft 218. Rotor 210 was held in place by bearings 220 and 222. The chain extending fluid was held in place by circular seals 224, 226, and 228. Fluid $A_2$ was injected from syringe 202 and fluid $B_2$ was injected from syringe 204.

Gear train 214, handle 212 and rotor 210 are attached to support member 230 forming a separate unit. Support member 230 is bolted onto stator 232 by way of bolts 234 and 236. Stator 232 has an internal diameter of 10.7 cm. The distance between stator 232 and rotor 210 is 3 mm.

For cure, the mold was held at 240° C. for three hours. The elastomeric cylindrical hoop which was formed was removed from the mold. Two additional cylindrical hoops were produced by the above procedure, except that the rotor was turned 4 and 8 revolutions respectively.

Dumbell-shaped sections were cut from each of the laminated cylindrical hoops. The dimension of the dumbells were: Length 10 cm; length of narrow section 3.5 cm; width at ends 1.3 cm, width of narrow section 3 mm.

The flexing properties of these sections are shown in Table I. In this case, the flexing data was obtained by means of the Monsanto Fatigue Tester. They were tested with 0.25 mm scores parallel to the planes of the lamellae. The fact that neither the hard or soft layers alone had flex lives as good as the laminates, suggest that a homogeneous equivalent would have had a very low flex life. This example shows the advantage of laminates in arresting cracks propagating perpendicularly to the planes of the lamellae. The test involves cyclical stretching of the sample to 1.5 times its original length.

TABLE I

PROPERTIES OF LAMINATES OF THE 'A' AND 'B' LIQUIDS

|  | 'A' Hard Layer | 'B' Soft Layer | Aver. | Laminates Four Layers | Eight Layers | Sixteen Layers |
|---|---|---|---|---|---|---|
| Modified Monsanto Fatigue Cycles to Failure With 0.01" Parallel Score | 100 | 3000 | — | 6000 | 700,000 | 400,000 |
| Thickness of Each Layer In Millimeters |  |  |  | 0.75 | 0.375 | 0.19 |

The mechanism of this Example is presently being redesigned to manufacture elastomeric bushing inserts. A subsequent modification may include rotationally casting the bushings between inner and outer steel sleeves.

EXAMPLE III

Example II was repeated using the device of FIG. 4 having the cylindrical rotor replaced with tapered rotor 300 having the following dimensions:
Top: 9.5 cm
Bottom: 10.1 cm
Height: 7.4 cm The tapered rotor 300 is shown in FIG. 6. The products made from a variety of chemically extending liquids all showed good laminated structure. The thicknesses of the part produced was top 6 mm and bottom 3 mm.

In practicing the present invention, it is important to prevent the presence of bubbles in the curable material in the mold cavity. Bubbles tend to disrupt the uniformity of the laminates. It is also important that the inside of the mold cavity be smooth and free of protrusions which would disrupt the uniformity of the laminate. In the normal practice of the invention the mold core is rotated at a relatively low speed in order to obtain smooth laminar flow of the liquid which forms the laminate. The speed of rotation can vary from 0.1 to 10 revolutions per minute and is preferably from 0.5 to 5 revolutions per minute.

Other applications of the present invention include:

(1) The manufacture of toroidal air chambers for run flat tires. The air chamber being smaller than the tire to prevent contact when the tire is inflated.

(2) The manufacture of cylinders to be formed into tires. The cylinders are formed by chain extending the liquids in the laminating mold, then cross-linked at higher temperatures in a forming mold.

(3) The manufacture of bushings which can withstand a considerable number of flexing cycles.

(4) The manfacture of boots for covering dish brake pistons and other reciprocating cylindrical parts which would otherwise be exposed.

(5) The manufacture of air springs.

(6) The manufacture of pneumatic closure valves as in 2 above, in the shape of an inflatable and deflatable treadless tire carcass. The closure valves fit in the bottom opening of storage bins. In the inflated state, they block the discharge of the bins' contents. When deflated the contents are discharged.

(7) The manufacture of tire carcasses and/or tire treads which are later attached, adhered and cured to the alternative components.

We claim:

1. In an apparatus for molding a tire in a toroidal configuration said apparatus having in combination:
   (a) a closed mold cavity, the cavity having a toroidal inner surface and a toroidal outer surface which define the shape of the tire to be molded, the inner cavity surface having a common axis with the outer cavity surface;
   (b) a plurality of feedports arranged to introduce at least two liquids without mixing into a toroidal cavity formed by the two surfaces;
   (c) means to cure the tire formed in the mold cavity;
   wherein the improvement comprises:
   (d) separate reservoirs for different extendable liquids attached to the feedports;
   (e) means for simultaneously injecting the different extendable liquids in metered amounts through the feedports to fill the cavity with alternate circumferential segments within the cavity, each segment extending from the inner surface to the outer surface of the cavity; and
   (f) means to rotate the inner cavity surface with respect to the outer cavity surface after the cavity is filled and prior to cure to form a laminated tire from the at least two different liquids.

* * * * *